(12) United States Patent
Xue et al.

(10) Patent No.: US 10,233,739 B2
(45) Date of Patent: Mar. 19, 2019

(54) CONTROLLING WELLBORE DRILLING SYSTEMS

(71) Applicant: Halliburton Energy Services, Inc., Houston, TX (US)

(72) Inventors: Yuzhen Xue, Carrollton, TX (US); Jason D. Dykstra, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 230 days.

(21) Appl. No.: 15/036,029

(22) PCT Filed: Dec. 6, 2013

(86) PCT No.: PCT/US2013/073682
§ 371 (c)(1),
(2) Date: May 11, 2016

(87) PCT Pub. No.: WO2015/084405
PCT Pub. Date: Jun. 11, 2015

(65) Prior Publication Data
US 2016/0290118 A1    Oct. 6, 2016

(51) Int. Cl.
| | | |
|---|---|---|
| *E21B 44/00* | (2006.01) | |
| *E21B 47/00* | (2012.01) | |
| *E21B 47/12* | (2012.01) | |
| *G05B 15/02* | (2006.01) | |
| *E21B 7/04* | (2006.01) | |

(52) U.S. Cl.
CPC .............. *E21B 44/00* (2013.01); *E21B 47/00* (2013.01); *E21B 47/12* (2013.01); *G05B 15/02* (2013.01); *E21B 7/04* (2013.01); *E21B 7/046* (2013.01)

(58) Field of Classification Search
CPC .......... E21B 44/00; E21B 47/00; E21B 47/12; E21B 7/04; E21B 7/046; G05B 15/02
USPC ........................................................ 700/275
See application file for complete search history.

(56) References Cited

U.S. PATENT DOCUMENTS

| | | |
|---|---|---|
| 6,732,052 B2 | 5/2004 | Macdonald et al. |
| 6,785,641 B1 * | 8/2004 | Huang .................... E21B 10/00 175/45 |
| 7,054,750 B2 | 5/2006 | Rodney et al. |

(Continued)

FOREIGN PATENT DOCUMENTS

WO      WO2010059295 A1      5/2010

OTHER PUBLICATIONS

PCT International Search Report and Written Opinion of the International Searching Authority, PCT/US2013/073682, dated Sep. 2, 2014, 12 pages.

*Primary Examiner* — Dzung Tran
(74) *Attorney, Agent, or Firm* — Alan Bryson; Parker Justiss, P.C.

(57) ABSTRACT

Techniques for controlling downhole drilling equipment include determining a nominal model of downhole drilling dynamics based on sensor measurements from the downhole drilling equipment; determining an uncertainty for the nominal model of downhole drilling dynamics; determining, based on the uncertainty for the nominal model of downhole drilling dynamics, a set of models that deviate from the nominal model of downhole drilling dynamics; and generating a virtual controller for the downhole drilling equipment based on the nominal model and the set of models that deviate from the nominal model.

22 Claims, 11 Drawing Sheets

(56) References Cited

U.S. PATENT DOCUMENTS

| | | |
|---|---|---|
| 7,556,104 B2 | 7/2009 | Jeffryes |
| 8,014,987 B2 | 9/2011 | Pabon et al. |
| 8,185,217 B2 | 5/2012 | Thiele |
| 8,214,188 B2 | 7/2012 | Bailey et al. |
| 8,453,764 B2 | 6/2013 | Turner et al. |
| 8,527,248 B2 | 9/2013 | Thambynayagam et al. |
| 2008/0314641 A1 | 12/2008 | McClard |
| 2010/0191516 A1 | 7/2010 | Benish et al. |
| 2011/0186353 A1 | 8/2011 | Turner et al. |
| 2011/0264429 A1 | 10/2011 | Lee et al. |
| 2012/0048621 A1 | 3/2012 | Stewart et al. |
| 2012/0292110 A1 | 11/2012 | Downtown |

\* cited by examiner

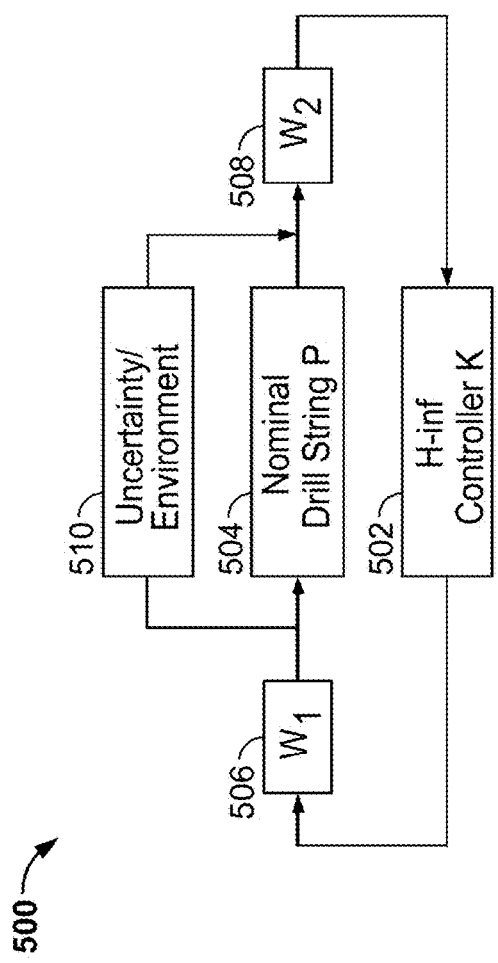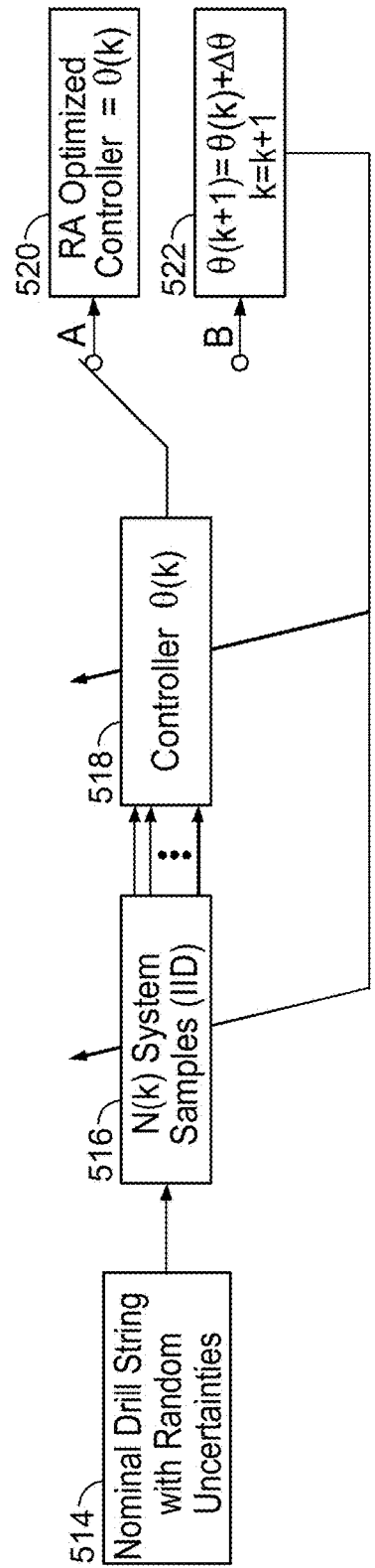
FIG. 5A
FIG. 5B

CONTROLLING WELLBORE DRILLING SYSTEMS

CROSS-REFERENCE TO RELATED APPLICATIONS

This application is a U.S. National Phase Application under 35 U.S.C. § 371 and claims the benefit of priority to International Application Serial Number PCT/US2013/073682, filed on Dec. 6, 2013, the contents of which are hereby incorporated by reference.

TECHNICAL BACKGROUND

This disclosure relates to management (e.g., automated) of wellbore operations for the production of hydrocarbons from subsurface formations.

BACKGROUND

Drilling for hydrocarbons, such as oil and gas, typically involves the operation of drilling equipment at underground depths that can reach down to thousands of feet below the surface. Such remote distances of downhole drilling equipment, combined with unpredictable downhole operating conditions and vibrational drilling disturbances, creates numerous challenges in accurately controlling the trajectory of a wellbore. Compounding these problems is often the existence of neighboring wellbores, sometimes within close proximity of each other, that restricts the tolerance for drilling error. Drilling operations typically collect measurements from downhole sensors located near the downhole drilling equipment to detect various conditions related to the drilling, such as position and angle of the wellbore trajectory, characteristics of the rock formation, pressure, temperature, acoustics, radiation, etc. Such sensor measurement data is typically transmitted to the surface, where human operators analyze the data to adjust the downhole drilling equipment. However, sensor measurements can be inaccurate, delayed, or infrequent, limiting the effectiveness of using such measurements. Often, a human operator is left to use best-guess estimates of the wellbore trajectory in controlling the drilling operation.

DESCRIPTION OF DRAWINGS

FIGS. 5A and 5B are flow diagrams of example design procedures for robust stability controllers;

DETAILED DESCRIPTION

Figure 1:
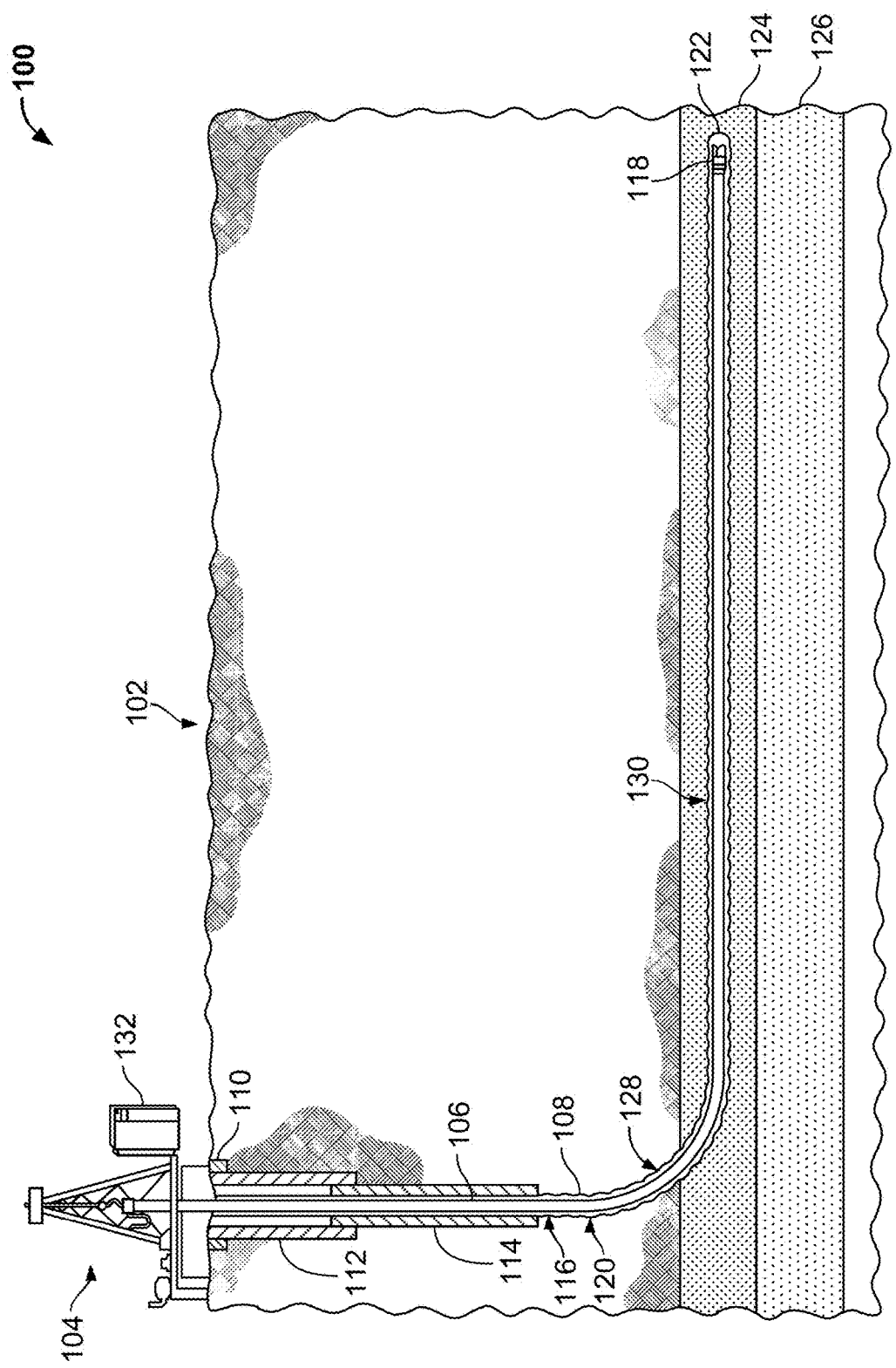
FIG. 1 illustrates an example of an implementation of at least a portion of a wellbore system in the context of a downhole operation.

This disclosure describes, generally, automated control of wellbore drilling operations to improve the stability of drilling in unpredictable and/or unknown wellbore conditions. In particular, techniques are described in which a model of downhole drilling dynamics is estimated, and a controller (e.g., a virtual controller) for downhole drilling equipment (e.g., a bottom hole assembly, drill string, or other equipment) is designed to satisfy a stability criterion despite possible errors in the estimated model of downhole drilling dynamics. In some examples, the system may design the controller (e.g., a virtual controller) to achieve a desired performance specification while also satisfying a stability criterion based on different types of uncertainties, disturbances and noise in the downhole environment. In some examples, the system may design multiple virtual controllers, each with a different stability criterion, and may adaptively switch between the multiple virtual controllers based on the changing downhole environment.

The downhole drilling equipment that is modeled and controlled may include, as examples, a bottom hole assembly (BHA) or a drill string, or any other suitable downhole drilling equipment or combination of downhole drilling equipment. The virtual controller(s) may be provided to the downhole drilling equipment or may be provided to an above-surface system that controls the downhole drilling equipment. As a particular illustrative example, the discussion below considers a scenario of controlling a BHA by providing one or more virtual controllers (e.g., a BHA controller) to an above-surface control system that controls the BHA.

The system may monitor the performance of the drilling operation, and determine whether to update the model of downhole drilling equipment (e.g., a BHA, drill string, or other equipment) dynamics. If the system determines that the model of downhole drilling equipment (e.g., a BHA, drill string, or other equipment) dynamics diverges significantly from sensor measurements, then the system may identify a new model of downhole drilling equipment dynamics based on updated sensor measurements. This model update may involve, picking a different model altogether, re-linearizing the same non-linear model, or picking different values of parameters for the same model. In some examples, the model may be data-driven, rather than based on first-principles, in which case the model update may select different data-fitting parameters. In the latter case, parameter-fitting may be achieved by any suitable estimation technique, such as least-squares, to derive an appropriate input-output mapping, without necessarily formulating a model of the downhole physical interactions.

In some examples, the system may operate on two different time-scales. For example, the system may design and update a controller for the downhole drilling equipment (e.g., a BHA, drill string, or other equipment) on a slow time scale (e.g., using system identification techniques), and the downhole drilling equipment controller itself may control drilling in the wellbore on a faster time-scale. In particular, the system may use a slow time-scale to train the downhole drilling equipment controller to learn the true characteristics of the downhole dynamics, and on a faster time-scale, the downhole drilling equipment controller may adapt the downhole drilling equipment control input based on frequent sensor measurements.

In a general implementation, a computer-implemented method of controlling downhole drilling equipment includes determining a nominal model of downhole drilling dynamics based on sensor measurements from the downhole drilling equipment; determining an uncertainty for the nominal model of downhole drilling dynamics; determining, based on the uncertainty for the nominal model of downhole drilling dynamics, a set of models that deviate from the nominal model of downhole drilling dynamics; and generating a virtual controller for the downhole drilling equipment based on the nominal model and the set of models that deviate from the nominal model.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, generating a virtual controller for the downhole drilling equipment based on the nominal model and the set of models that deviate from the nominal model includes generating a virtual controller for the downhole drilling equipment that satisfies a stability criterion for the nominal model and that satisfies the stability criterion for the set of models that deviate from the nominal model.

In a second aspect combinable with any of the general implementations, generating a virtual controller for the downhole drilling equipment that satisfies a stability criterion for the nominal model of downhole drilling dynamics and that satisfies the stability criterion for the set of models that deviate from the nominal model of downhole drilling dynamics includes generating a virtual controller that satisfies a bounded-input-bounded-output criterion for each model in the set of models that deviate from the nominal model of downhole drilling dynamics.

In a third aspect combinable with any of the general implementations, the bounded-input-bounded-output criterion comprises an H-infinity stability criterion.

In a fourth aspect combinable with any of the general implementations, generating a virtual controller for the downhole drilling equipment that satisfies a stability criterion for the nominal model of downhole drilling dynamics and that satisfies the stability criterion for the set of models that deviate from the nominal model of downhole drilling dynamics includes generating a random subset of models from the set of models that deviate from the nominal model of downhole drilling dynamics; and generating a virtual controller that satisfies an input-output stability criterion for each model in the random subset of models.

In a fifth aspect combinable with any of the general implementations, the input-output stability criterion comprises at least one of an H-infinity stability criterion or an H-2 stability criterion.

In a sixth aspect combinable with any of the general implementations, determining an uncertainty for the nominal model of downhole drilling dynamics includes determining a statistical distribution of a parameter of the nominal model of downhole drilling dynamics, and determining, based on the uncertainty for the nominal model of downhole drilling dynamics, a set of models that deviate from the nominal model of downhole drilling dynamics includes determining a set of random parameter values selected randomly from the statistical distribution of the parameter.

A seventh aspect combinable with any of the general implementations further includes determining a model of vibrational disturbances for the downhole drilling equipment. In the seventh aspect, generating a virtual controller for the downhole drilling equipment includes generating a virtual controller for the downhole drilling equipment that satisfies the stability criterion, subject to the model of vibrational disturbances.

In an eighth aspect combinable with any of the general implementations, the model of vibrational disturbances includes a frequency characteristic of the nominal model of downhole drilling dynamics, and generating a virtual controller for the downhole drilling equipment that satisfies the stability criterion, subject to the model of vibrational disturbances, includes generating a virtual controller that attenuates frequencies at which the frequency characteristic of the nominal model of downhole drilling dynamics has a gain exceeding a gain threshold.

A ninth aspect combinable with any of the general implementations, further includes identifying updated sensor measurements from the downhole drilling equipment; detecting that a model update event has occurred based on the updated sensor measurements; and updating the nominal model of downhole drilling dynamics based on detecting that a model update event has occurred.

A tenth aspect combinable with any of the general implementations, further includes receiving high-fidelity sensor measurements according to a first time-scale, and updating the nominal model of downhole drilling dynamics based on the high-fidelity sensor measurements according to the first time-scale; and configuring the virtual controller to apply control inputs to the downhole drilling equipment according to a second time-scale that is faster than the first time-scale, based on low-fidelity sensor measurements that are received according to the second time-scale.

In an eleventh aspect combinable with any of the general implementations, detecting that a model update event has occurred includes determining a divergence threshold for the nominal model of downhole drilling dynamics; and determining that a difference between the nominal model of downhole drilling dynamics and sensor measurements exceeds the divergence threshold.

In a twelfth aspect combinable with any of the general implementations, determining a divergence threshold for the nominal model of downhole drilling dynamics further includes determining the divergence threshold based on at least one of a planned wellbore path or a wellbore tracking error constraint.

In a thirteenth aspect combinable with any of the general implementations, updating the model of downhole drilling dynamics includes updating a parameter in the nominal model of downhole drilling dynamics. The thirteenth aspect also includes updating the virtual controller based on the updated model of downhole drilling dynamics.

In a fourteenth aspect combinable with any of the general implementations, the downhole drilling equipment includes at least one of a bottom hole assembly (BHA) or a drill string.

In a fifteenth aspect combinable with any of the general implementations, generating a virtual controller for the downhole drilling equipment that satisfies a stability criterion for the nominal model of downhole drilling dynamics and that satisfies the stability criterion for the set of models that deviate from the nominal model includes determining a first virtual controller that satisfies a first stability criterion for the nominal model of downhole drilling dynamics and that satisfies the first stability criterion for the set of models that deviate from the nominal model; determining a second virtual controller that satisfies a second stability criterion for the nominal model of downhole drilling dynamics and that satisfies the second stability criterion for the set of models that deviate from the nominal model, wherein the second stability criterion is different than the first stability criterion.

A sixteenth aspect combinable with any of the general implementations further includes determining that a virtual controller switching event has occurred; and switching between the first virtual controller and the second virtual controller based on determining that a virtual controller switching event has occurred.

In a seventeenth aspect combinable with any of the general implementations, determining that a virtual controller switching event has occurred includes determining a target steady-state value of a control input for the downhole drilling equipment based on the nominal model of downhole drilling dynamics; comparing the steady-state value of the control input for the downhole drilling equipment with a measured value of the control input for the downhole drilling equipment; and determining that a difference between the steady-state value of the control input for the downhole drilling equipment and the measured value of the control input for the downhole drilling equipment exceeds a tracking threshold.

In an eighteenth aspect combinable with any of the general implementations, determining that a virtual controller switching event has occurred includes determining a planned wellbore path; and determining, from the planned wellbore path, that a probability of collision with another wellbore exceeds a collision threshold, or that a radius of curvature of the planned wellbore path falls below a radius threshold.

A nineteenth aspect combinable with any of the general implementations further includes determining, based on the virtual controller for the downhole drilling equipment, a control input for the downhole drilling equipment based on sensor measurements from the downhole drilling equipment; and applying the control input to the downhole drilling equipment.

In a twentieth aspect combinable with any of the general implementations, determining a control input for the downhole drilling equipment includes determining at least one of a weight-on-bit, a rate of penetration, a fluid flow rate, a torque at bit, a torque at rotary table, or an RPM.

Various implementations of a control system for wellbore drilling according to the present disclosure may include none, one or some of the following features. For example, the system may improve the stability and efficiency of drilling operations. In particular, techniques described herein may enable automated downhole drilling equipment (e.g., a BHA, drill string, or other equipment) control that is robust to both model uncertainty and random disturbances in the drilling. In some examples, the system may improve accuracy of drilling operations, and more closely track a planned wellbore path with fewer deviations, by simultaneously adapting to both small changes in wellbore conditions (on a fast time-scale) as well as adapting to larger changes in wellbore conditions (on a slower time-scale). The system may thus improve the efficiency and costs of drilling operations by reducing the risks of uncertainty-induced drilling failures.

The details of one or more implementations are set forth in the accompanying drawings and the description below. Other features, objects, and advantages will be apparent from the description and drawings, and from the claims.

FIG. 1 illustrates a portion of one implementation of a deviated wellbore system 100 according to the present disclosure. Although shown as a deviated system (e.g., with a directional, horizontal, or radiussed wellbore), the system can include a relatively vertical wellbore only (e.g., including normal drilling variations) as well as other types of wellbores (e.g., laterals, pattern wellbores, and otherwise). Moreover, although shown on a terranean surface, the system 100 may be located in a sub-sea or water-based environment. Generally, the deviated wellbore system 100 accesses one or more subterranean formations, and provides easier and more efficient production of hydrocarbons located in such subterranean formations. Further, the deviated wellbore system 100 may allow for easier and more efficient fracturing or stimulation operations. As illustrated in FIG. 1, the deviated wellbore system 100 includes a drilling assembly 104 deployed on a terranean surface 102. The drilling assembly 104 may be used to form a vertical wellbore portion 108 extending from the terranean surface 102 and through one or more geological formations in the Earth. One or more subterranean formations, such as productive formation 126, are located under the terranean surface 102. As will be explained in more detail below, one or more wellbore casings, such as a surface casing 112 and intermediate casing 114, may be installed in at least a portion of the vertical wellbore portion 108.

In some implementations, the drilling assembly 104 may be deployed on a body of water rather than the terranean surface 102. For instance, in some implementations, the terranean surface 102 may be an ocean, gulf, sea, or any other body of water under which hydrocarbon-bearing formations may be found. In short, reference to the terranean surface 102 includes both land and water surfaces and contemplates forming and/or developing one or more deviated wellbore systems 100 from either or both locations.

Generally, the drilling assembly 104 may be any appropriate assembly or drilling rig used to form wellbores or wellbores in the Earth. The drilling assembly 104 may use traditional techniques to form such wellbores, such as the vertical wellbore portion 108, or may use nontraditional or novel techniques. In some implementations, the drilling assembly 104 may use rotary drilling equipment to form such wellbores. Rotary drilling equipment is known and may consist of a drill string 106 and a bottom hole assembly (BHA) 118. In some implementations, the drilling assembly 104 may consist of a rotary drilling rig. Rotating equipment on such a rotary drilling rig may consist of components that serve to rotate a drill bit, which in turn forms a wellbore, such as the vertical wellbore portion 108, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string 106. The drill string 106 is typically attached to the drill bit within the bottom hole assembly 118. A swivel, which is attached to hoisting equipment, carries much, if not all of, the weight of the drill string 106, but may allow it to rotate freely.

The drill string 106 typically consists of sections of heavy steel pipe, which are threaded so that they can interlock together. Below the drill pipe are one or more drill collars, which are heavier, thicker, and stronger than the drill pipe. The threaded drill collars help to add weight to the drill string 106 above the drill bit to ensure that there is enough downward pressure on the drill bit to allow the bit to drill through the one or more geological formations. The number and nature of the drill collars on any particular rotary rig may be altered depending on the downhole conditions experienced while drilling.

The drill bit is typically located within or attached to the bottom hole assembly 118, which is located at a downhole end of the drill string 106. The drill bit is primarily responsible for making contact with the material (e.g., rock) within the one or more geological formations and drilling through such material. According to the present disclosure, a drill bit type may be chosen depending on the type of geological formation encountered while drilling. For example, different geological formations encountered during drilling may require the use of different drill bits to achieve maximum drilling efficiency. Drill bits may be changed because of such differences in the formations or because the drill bits experience wear. Although such detail is not critical to the present disclosure, there are generally four types of drill bits, each suited for particular conditions. The four most common types of drill bits consist of: delayed or dragged bits, steel to rotary bits, polycrystalline diamond compact bits, and diamond bits. Regardless of the particular drill bits selected, continuous removal of the "cuttings" is essential to rotary drilling.

The circulating system of a rotary drilling operation, such as the drilling assembly 104, may be an additional component of the drilling assembly 104. Generally, the circulating system has a number of main objectives, including cooling and lubricating the drill bit, removing the cuttings from the drill bit and the wellbore, and coating the walls of the wellbore with a mud type cake. The circulating system consists of drilling fluid, which is circulated down through the wellbore throughout the drilling process. Typically, the components of the circulating system include drilling fluid pumps, compressors, related plumbing fixtures, and specialty injectors for the addition of additives to the drilling fluid. In some implementations, such as, for example, during a horizontal or directional drilling process, downhole motors may be used in conjunction with or in the bottom hole assembly 118. Such a downhole motor may be a mud motor with a turbine arrangement, or a progressive cavity arrangement, such as a Moineau motor. These motors receive the drilling fluid through the drill string 106 and rotate to drive the drill bit or change directions in the drilling operation.

In many rotary drilling operations, the drilling fluid is pumped down the drill string 106 and out through ports or jets in the drill bit. The fluid then flows up toward the surface 102 within an annular space (e.g., an annulus) between the wellbore portion 108 and the drill string 106, carrying cuttings in suspension to the surface. The drilling fluid, much like the drill bit, may be chosen depending on the type of geological conditions found under subterranean surface 102. For example, certain geological conditions found and some subterranean formations may require that a liquid, such as water, be used as the drilling fluid. In such situations, in excess of 100,000 gallons of water may be required to complete a drilling operation. If water by itself is not suitable to carry the drill cuttings out of the bore hole or is not of sufficient density to control the pressures in the well, clay additives (bentonite) or polymer-based additives, may be added to the water to form drilling fluid (e.g., drilling mud). As noted above, there may be concerns regarding the use of such additives in underground formations which may be adjacent to or near subterranean formations holding fresh water.

In some implementations, the drilling assembly 104 and the bottom hole assembly 118 may operate with air or foam as the drilling fluid. For instance, in an air rotary drilling process, compressed air lifts the cuttings generated by the drill bit vertically upward through the annulus to the terranean surface 102. Large compressors may provide air that is then forced down the drill string 106 and eventually escapes through the small ports or jets in the drill bit. Cuttings removed to the terranean surface 102 are then collected.

As noted above, the choice of drilling fluid may depend on the type of geological formations encountered during the drilling operations. Further, this decision may be impacted by the type of drilling, such as vertical drilling, horizontal drilling, or directional drilling. In some cases, for example, certain geological formations may be more amenable to air drilling when drilled vertically as compared to drilled directionally or horizontally.

As illustrated in FIG. 1, the bottom hole assembly 118, including the drill bit, drills or creates the vertical wellbore portion 108, which extends from the terranean surface 102 towards the target subterranean formation 124 and the productive formation 126. In some implementations, the target subterranean formation 124 may be a geological formation amenable to air drilling. In addition, in some implementations, the productive formation 126 may be a geological formation that is less amenable to air drilling processes. As illustrated in FIG. 1, the productive formation 126 is directly adjacent to and under the target formation 124. Alternatively, in some implementations, there may be one or more intermediate subterranean formations (e.g., different rock or mineral formations) between the target subterranean formation 124 and the productive formation 126.

In some implementations of the deviated wellbore system 100, the vertical wellbore portion 108 may be cased with one or more casings. As illustrated, the vertical wellbore portion 108 includes a conductor casing 110, which extends from the terranean surface 102 shortly into the Earth. A portion of the vertical wellbore portion 108 enclosed by the conductor casing 110 may be a large diameter wellbore. For instance, this portion of the vertical wellbore portion 108 may be a 17½" wellbore with a 13⅜" conductor casing 110. Additionally, in some implementations, the vertical wellbore portion 108 may be offset from vertical (e.g., a slant wellbore). Even further, in some implementations, the vertical wellbore portion 108 may be a stepped wellbore, such that a portion is drilled vertically downward and then curved to a substantially horizontal wellbore portion. The substantially horizontal wellbore portion may then be turned downward to a second substantially vertical portion, which is then turned to a second substantially horizontal wellbore portion. Additional substantially vertical and horizontal wellbore portions may be added according to, for example, the type of terranean surface 102, the depth of one or more target subterranean formations, the depth of one or more productive subterranean formations, and/or other criteria.

Downhole of the conductor casing 110 may be the surface casing 112. The surface casing 112 may enclose a slightly smaller wellbore and protect the vertical wellbore portion 108 from intrusion of, for example, freshwater aquifers located near the terranean surface 102. The vertical wellbore portion 108 may than extend vertically downward toward a kickoff point 120, which may be between 500 and 1,000 feet above the target subterranean formation 124. This portion of the vertical wellbore portion 108 may be enclosed by the intermediate casing 114. The diameter of the vertical wellbore portion 108 at any point within its length, as well as the casing size of any of the aforementioned casings, may be an appropriate size depending on the drilling process.

Upon reaching the kickoff point 120, drilling tools such as logging and measurement equipment may be deployed into the wellbore portion 108. At that point, a determination of the exact location of the bottom hole assembly 118 may be made and transmitted to the terranean surface 102. Further, upon reaching the kickoff point 120, the bottom hole assembly 118 may be changed or adjusted such that appropriate directional drilling tools may be inserted into the vertical wellbore portion 108.

As illustrated in FIG. 1, a curved wellbore portion 128 and a horizontal wellbore portion 130 have been formed within one or more geological formations. Typically, the curved wellbore portion 128 may be drilled starting from the downhole end of the vertical wellbore portion 108 and deviated from the vertical wellbore portion 108 toward a predetermined azimuth gaining from between 9 and 18 degrees of angle per 100 feet drilled. Alternatively, different predetermined azimuth may be used to drill the curved wellbore portion 128. In drilling the curved wellbore portion 128, the bottom hole assembly 118 often uses measurement-while-drilling ("MWD") equipment to more precisely determine the location of the drill bit within the one or more geological formations, such as the target subterranean formation 124. Generally, MWD equipment may be utilized to directionally steer the drill bit as it forms the curved wellbore portion 128, as well as the horizontal wellbore portion 130.

Alternatively to or in addition to MWD data being compiled during drilling of the wellbore portions shown in FIG. 1, certain high-fidelity measurements (e.g., surveys) may be taken during the drilling of the wellbore portions. For example, surveys may be taken periodically in time (e.g., at particular time durations of drilling), periodically in wellbore length (e.g., at particular distances drilled, such as every 30 feet or otherwise), or as needed or desired (e.g., when there is a concern about the path of the wellbore). Typically, during a survey, a completed measurement of the inclination and azimuth of a location in a well (typically the total depth at the time of measurement) is made in order to know, with reasonable accuracy, that a correct or particular wellbore path is being followed (e.g., according to a wellbore plan). Further, position may be helpful to know in case a relief well must be drilled. High-fidelity measurements may include inclination from vertical and the azimuth (or compass heading) of the wellbore if the direction of the path is critical. These high-fidelity measurements may be made at discrete points in the well, and the approximate path of the wellbore computed from the discrete points. The high-fidelity measurements may be made with any suitable high-fidelity sensor. Examples include, for instance, simple pendulum-like devices to complex electronic accelerometers and gyroscopes. For example, in simple pendulum measurements, the position of a freely hanging pendulum relative to a measurement grid (attached to the housing of a measurement tool and assumed to represent the path of the wellbore) is captured on photographic film. The film is developed and examined when the tool is removed from the wellbore, either on wireline or the next time pipe is tripped out of the hole.

The horizontal wellbore portion 130 may typically extend for hundreds, if not thousands, of feet within the target subterranean formation 124. Although FIG. 1 illustrates the horizontal wellbore portion 130 as exactly perpendicular to the vertical wellbore portion 108, it is understood that directionally drilled wellbores, such as the horizontal wellbore portion 130, have some variation in their paths. Thus, the horizontal wellbore portion 130 may include a "zigzag" path yet remain in the target subterranean formation 124. Typically, the horizontal wellbore portion 130 is drilled to a predetermined end point 122, which, as noted above, may be up to thousands of feet from the kickoff point 120. As noted above, in some implementations, the curved wellbore portion 128 and the horizontal wellbore portion 130 may be formed utilizing an air drilling process that uses air or foam as the drilling fluid.

The wellbore system 100 also includes a control system 132 that is communicative with the BHA 118. The control system 132 may be located at the wellsite (e.g., at or near drilling assembly 104, either above-surface or underground) or may be remote from the wellsite (e.g., at a remote location and communicative with components of the well site using one or more communication mechanisms). The control system 132 may also be communicative with other systems, devices, databases, and networks. Generally, the control system 132 may include a processor based computer or computers (e.g., desktop, laptop, server, mobile device, cell phone, or otherwise) that includes memory (e.g., magnetic, optical, RAM/ROM, removable, remote or local), a network interface (e.g., software/hardware based interface), and one or more input/output peripherals (e.g., display devices, keyboard, mouse, touchscreen, and others).

The control system 132 may at least partially control, manage, and execute operations associated with the drilling operation of the downhole drilling equipment. In some aspects, the control system 132 may predict a model of downhole drilling equipment (e.g., a BHA, drill string, or other equipment) dynamics and design a downhole drilling equipment (e.g., a BHA, drill string, or other equipment) controller (e.g., a virtual controller) to satisfy a stability criterion. The downhole drilling equipment controller (e.g., a virtual controller) may be included in the control system 132 (as a subcomponent or module), or may be separate from the control system 132 (e.g., as part of the downhole BHA 118). The control system 132 may control and adjust one or more of the illustrated components of wellbore system 100 dynamically, such as, in real-time during drilling operations at the wellbore system 100. The real-time control may be adjusted based on sensor measurement data or based on changing predictions of the wellbore trajectory, even without any sensor measurements.

The control system 132 may perform such control operations based on a model of downhole drilling equipment (e.g., a BHA, drill string, or other equipment) dynamics. The model of downhole drilling equipment dynamics may simulate various physical phenomena in the drilling operation, such as vibrational disturbances and sensor noise. The control system 132 may use the model of downhole drilling equipment dynamics to design a downhole drilling equipment controller (e.g., a virtual controller) that satisfies a stability criterion while achieving a desired performance specification (e.g., following a planned wellbore path with maximized rate of penetration). In general, a model of downhole drilling equipment dynamics may rely on an underlying state variable that evolves with time, representing changing conditions in the drilling operation. The state variable in the model of downhole drilling equipment dynamics may be an estimate of the true state of the downhole drilling equipment (e.g., a BHA, drill string, or other equipment), from which estimates of wellbore trajectory can be derived.

As downhole conditions may not be exactly known, the model of downhole drilling equipment (e.g., a BHA, drill string, or other equipment) dynamics may be incorrect. A drilling system may be subject to various dynamics, such as nonlinear, coupled dynamics involving time-varying bit-rock interactions, fluid-structure interactions, complicated planned wellbore shapes, and impact/rubbing forces between the drill pipe and its case. In many drilling scenarios, it is a challenge to develop an accurate model that can replicate the true downhole drilling equipment dynamics. In many cases, simplified models (e.g., lumped-mass models or finite-element models) are derived and applied to downhole drilling equipment controller (e.g., a virtual controller) design, typically with various simplifications such as model reduction, linearization around a predetermined configuration (with assumptions of small lateral motion), no fluid influence, and simple bit-rock interactions.

However, in reality, a model of downhole drilling equipment (e.g., a BHA, drill string, or other equipment) dynamics may not accurately reflect the true dynamics of the downhole operations. The mismatch between the model and reality is often referred to as model uncertainty. Due to model uncertainty, downhole drilling equipment controllers that are designed based on a particular model, when applied to the real drill string, may lead to unexpected behavior, and even instability, which may damage the bit or even ruin the well. Techniques described herein provide control techniques that may improve the stability of downhole drilling equipment controllers, while also satisfying drilling performance specifications.

Figure 2:
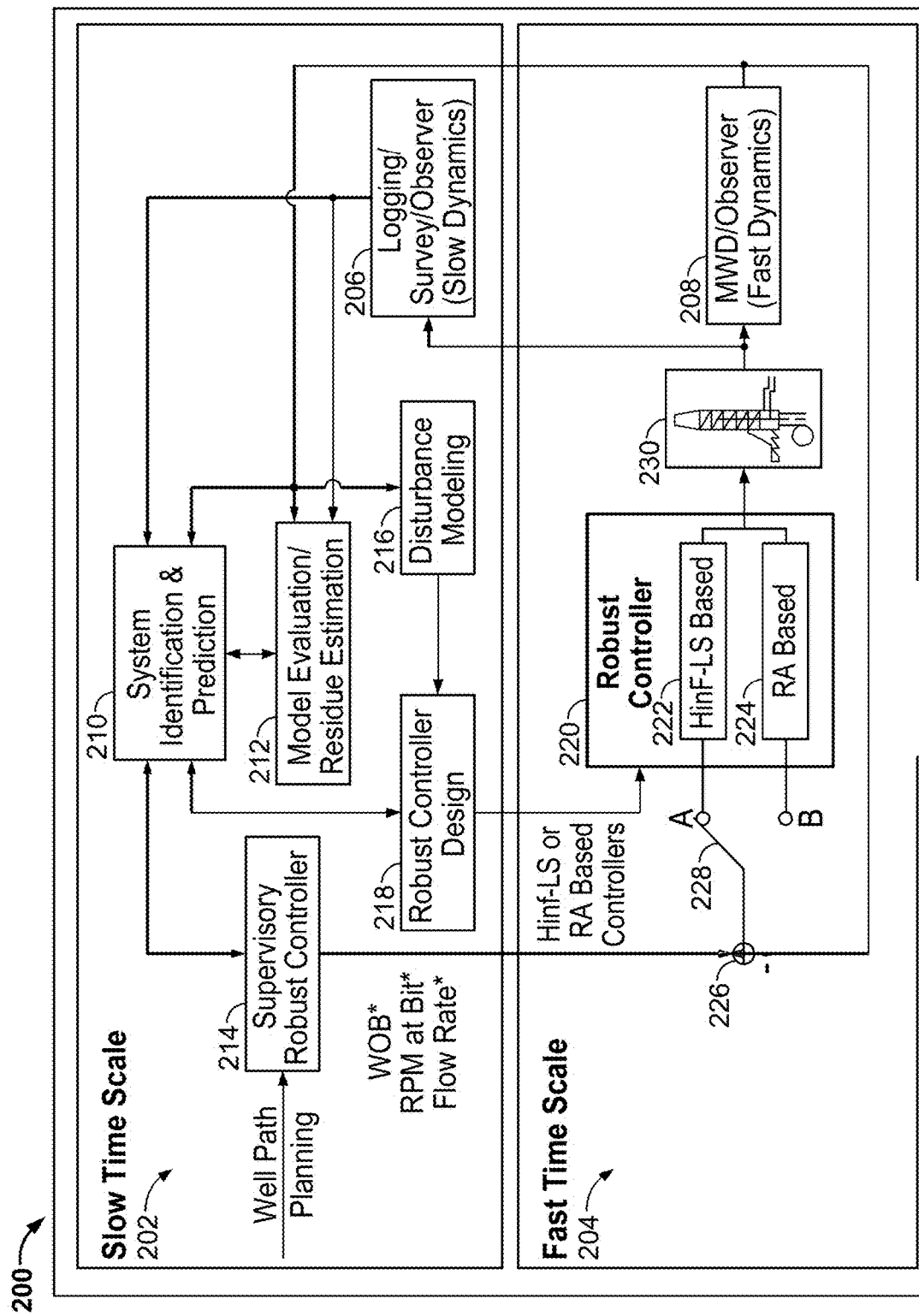
FIG. 2 is a flow diagram of an example process of adaptive robust control design of drilling systems.

FIG. 2 is a flow diagram of an example process of adaptive robust control design of drilling systems. In this example, process 200 generates downhole drilling equipment (e.g., a BHA, drill string, or other equipment) controllers based both on an H-infinity-loop-shaping ("Hinf-LS") and randomized algorithm ("RA") design. The illustrated process 200 is separated into two portions, corresponding to slow time-scale dynamics 202 and fast time-scale dynamics 204. The two time-scales may be implemented either in different physical components (e.g., in the control system 132 and the BHA 118) or in the same physical component (e.g., both in the control system 132). The slow dynamics 202 may be implemented, for example, in an above-surface controller or other module that has the computational resources to handle complex calculations. For example, components with large processing power may perform operations such as system identification ("SysID") and robust controller design, in a slow time-scale. In some examples, the slow dynamics 202 may estimate a model of downhole drilling equipment (e.g., a BHA, drill string, or other equipment) dynamics and design a downhole drilling equipment controller (e.g., a virtual controller) that adapts to slow-changing variables such as rock formations, changes in planned wellbore shape, rock mechanics, bit wear, etc. The fast dynamics 204 may be implemented, for example, in the downhole drilling equipment or another module that has more limited computational resources. The fast dynamics 204 may adapt the downhole drilling equipment controller to fast-changing variables such as the drill string's rotational and axial motion including RPM at bit, WOB, as well as the flow rate and pressure.

Sensor measurements in a slow time-scale may be determined by a slow time-scale observation module 206. For example, the slow time-scale observation module 206 may determine survey or logging measurements, such as rock formation change, changes in planned wellbore shape, changes in rock mechanics, and bit wear. Such slow time-scale measurements may be determined in periodic intervals, denoted here generically as T.

Sensor measurements on a fast time-scale may be determined by a fast time-scale observation module 208. For example, fast time-scale observation module 208 may determine measure-while-drilling (MWD) sensor measurements for fast dynamics, such as axial and rotational motion of the system. Additionally or alternatively, such fast dynamics may be estimated or predicted (e.g., in real-time) using a model of downhole drilling equipment (e.g., a BHA, drill string, or other equipment) dynamics.

A system identification and prediction module 210 may receive data from the observation modules 206 and 208, and may predict a model of downhole drilling equipment (e.g., a BHA, drill string, or other equipment) dynamics. In some examples, the system identification and prediction module 210 may determine both a steady-state model and a dynamic model. The drilling system steady state model may include, for example, the current rock formation, rock mechanics and bit wear model, and may include a probabilistic model of rock formation, rock mechanics and bit wear model over the next T interval. The second model may be a drilling system dynamics model. Although the drilling systems dynamics model may be a nonlinear time varying model, during a relatively short interval T, the system may be approximated by a linear model (e.g., a lumped mass or a finite element model). The linear model may be designed to be of a fixed predefined physical order, in which case the system identification and prediction module 210 may be responsible for identifying the unknown parameters of a fixed-order model. This is often referred to as a "gray-box" system identification approach. For example, in a lumped mass model, the unknown parameters are the stiffness and damping coefficients, as well as the mass and inertia. The dynamic model over the interval T may be predicted either with deterministic or probabilistic parameters.

In some examples, the predictions for both the steady state model and the dynamic model may be based on the data from the other wells in the field with the similar formation & rock mechanics, or from the historical data. In particular examples, a steady state model may ignore transient dynamics and model system parameters at their steady state values (e.g., similar to a kinematics model), and a dynamics model may model the transient behavior of system parameters.

A model evaluation/residue estimation module 212 evaluates the accuracy of the identified model of downhole drilling equipment (e.g., a BHA, drill string, or other equipment) dynamics. If the deviation (or residue) between the observed data and the system's identified model of downhole drilling equipment dynamics exceeds an assumed uncertainty level (residue threshold), then the system identification and prediction module 210 may recalculate the model of downhole drilling equipment dynamics. Otherwise, if the residue is safely within the assumed uncertainty level, then the model of downhole drilling equipment dynamics may remain unchanged for the next T interval. Whether or not the model of downhole drilling equipment dynamics accurately represents the true downhole system can be justified by statistical test methods. As an example, if a Gaussian uncertainty distribution is assumed, then a residue threshold may be set to when over 10% of the observed data lies out of two standard deviations of the mean of the Gaussian distribution. If this threshold is exceeded, then the model may be determined to be ineffective and a new model may be calculated. In time, the historical residue estimation may also help to refine the system's uncertainty distribution assumption and thus to improve the controller's effectiveness.

The residue threshold that triggers the model update may be associated with various factors. For example, one factor may be a planned wellbore path. For example, in directional drilling, when the planned wellbore path indicates a sharp turn, then the model of downhole drilling equipment (e.g., a BHA, drill string, or other equipment) dynamics may be required to more accurately model the downhole system. In this case, it may be desirable to have a small residue threshold so that the model of downhole drilling equipment dynamics is updated more frequently. Another factor that may affect the residue threshold is the performance capability of a robust controller that controls the downhole drilling equipment (e.g., robust controller 220). In some examples, the uncertainty bound allowed may be such that a robust controller 220 satisfying the drilling performance specifications can be practically implemented. In scenarios in which it is infeasible to find a robust controller that satisfies the performance specifications (e.g., when the uncertainty bound is too high), the model may be updated, for example, to reduce the uncertainty bound so that a robust controller can be designed under the performance specifications.

The predicted steady state model, combined with the planned wellbore path over the subsequent interval T may be passed to the supervisory robust controller 214 (e.g., virtual controller), which may compute the optimal steady state solution for a suitable downhole drilling equipment (e.g., a BHA, drill string, or other equipment) control input, such as weight on bit (WOB), rate of penetration (ROP), fluid flow rate, torque on bit, torque on rotary table, rotations per minutes (RPM), or other suitable control input to the drilling operation. In some examples, the supervisory robust controller 214 may utilize a randomized algorithm (RA) to calculate a steady-state downhole drilling equipment (e.g., a BHA, drill string, or other equipment) control input (e.g., an optimal steady-state input, or a sub-optimal steady-state input, or any other suitable steady-state input that satisfies) over a distribution of downhole drilling equipment models. These steady-state values of downhole drilling equipment control input may be used, for example, to track a performance specification that measures the accuracy of following the planned wellbore path with maximized ROP.

A disturbance modeling module 216 derives a model of disturbances (e.g., due to vibrations). The disturbance model may be determined, for example, based on the fast time-scale sensing data from a measure-while-drilling (MWD) sensor or from a predictive observer. The disturbance properties of the system may be used as part of the design of a robust controller (e.g., a virtual controller) that stabilizes the downhole system in spite of random vibrations and rock-bit interactions. An example of modeling disturbances is to use the frequency spectrum of the downhole dynamics. Such a frequency spectrum may be estimated, for example, by applying a Fast Fourier Transform (FFT) to the drill string's rotational or axial motion data. Compared to historical data or data from predrilled wells with similar drilling conditions, any abnormal frequencies where high power resides, for example, may be considered to be disturbance frequencies. Disturbance frequencies may be passed to the robust controller design module 218 in order to reduce the impact of disturbances to the downhole drilling equipment. An accurate estimate of disturbances may enable the disturbances to be decoupled from the drilling process, allowing a feed-forward controller to be added to the system to compensate for the disturbance.

The predicted model of BHA dynamics derived in the system identification and prediction module 210, combined with the disturbance model derived in the disturbance modeling module 216, is passed into the dynamic robust controller design module 218, where a robust controller is derived. In this example, two types of controllers are derived, RA and Hinf-LS. In general, any number and type of controller may be derived, to achieve any desired stability criterion and performance specification. The performance specification may include, as examples, suppressing disturbances, reducing overshoot, or efficiently tracking a reference signal, etc. In the drilling system, these specifications may correspond to suppressing damaging bit vibrations such as bit bouncing, bit whirling and stick/slip, reducing drill path tortuosity, and effectively tracking the desired steady state WOB, ROP, and flow rate values. In some examples, both RA and Hinf-LS controllers may be derived in software by solving a series of constrained inequality linear matrices.

The dynamic robust controllers that are designed in the dynamic robust controller design module 218 are then passed into the robust controller module 220, where they are implemented to control the downhole drilling equipment in the fast time-scale. In the example of FIG. 2, there are two real-time controller candidates, Hinf-LS controller 222 and RA controller 224 (e.g., virtual controllers) that may be implemented by the robust controller module 220 to control downhole drilling equipment. The decision of which virtual controller to use in controlling drilling equipment at a given time may depend on any number of suitable factors related to the drilling operation. In some examples, the decision may be made in real-time based on drilling conditions and/or drilling objectives. As a particular example, a differencing element 226 may determine (e.g., in real time) the difference between the WOB, ROP and flow rate measured or estimated from MWD/observer module 208 and the steady state values of WOB, ROP and flow rate (e.g., optimal steady-state values, sub-optimal steady-state values, or other suitable steady-state values) as determined from the supervisory robust controller 214. A switching element 228 switches between the two candidate controllers 222 and 224, depending on the difference computed by the differencing element 226, drilling performance specifications, and possibly other information (e.g., planned wellbore path). For example, the Hinf-LS controller 222 may be adopted when the drilling performance specification needs to be followed with more certainty. For example, when the drill bit is traveling through a thin layer of rock formation during horizontal drilling, then it may be desirable to follow the planned wellbore path with greater accuracy. On the other hand, the RA controller 224 may be adopted when the drilling performance specification can be slightly compromised in return for aggressive progress. For example, in a situation where slightly greater drilling path tortuosity is acceptable, it may be desirable to achieve more aggressive ROP.

The resulting downhole drilling equipment (e.g., a BHA, drill string, or other equipment) control input from the robust controller module 220 is then applied to the drilling system 230 (e.g., the drilling assembly 104, or the BHA 118, or any suitable drilling equipment or combination of drilling equipment in the wellbore system 100 of FIG. 1). The real-time control outputs of the drilling system 230 may include, as examples, the motor torque, hook load and pump rate on surface. The outputs of the drilling system may be measured using various sensors (e.g., survey sensors 206 or MWD sensors 208).

Figure 3A:
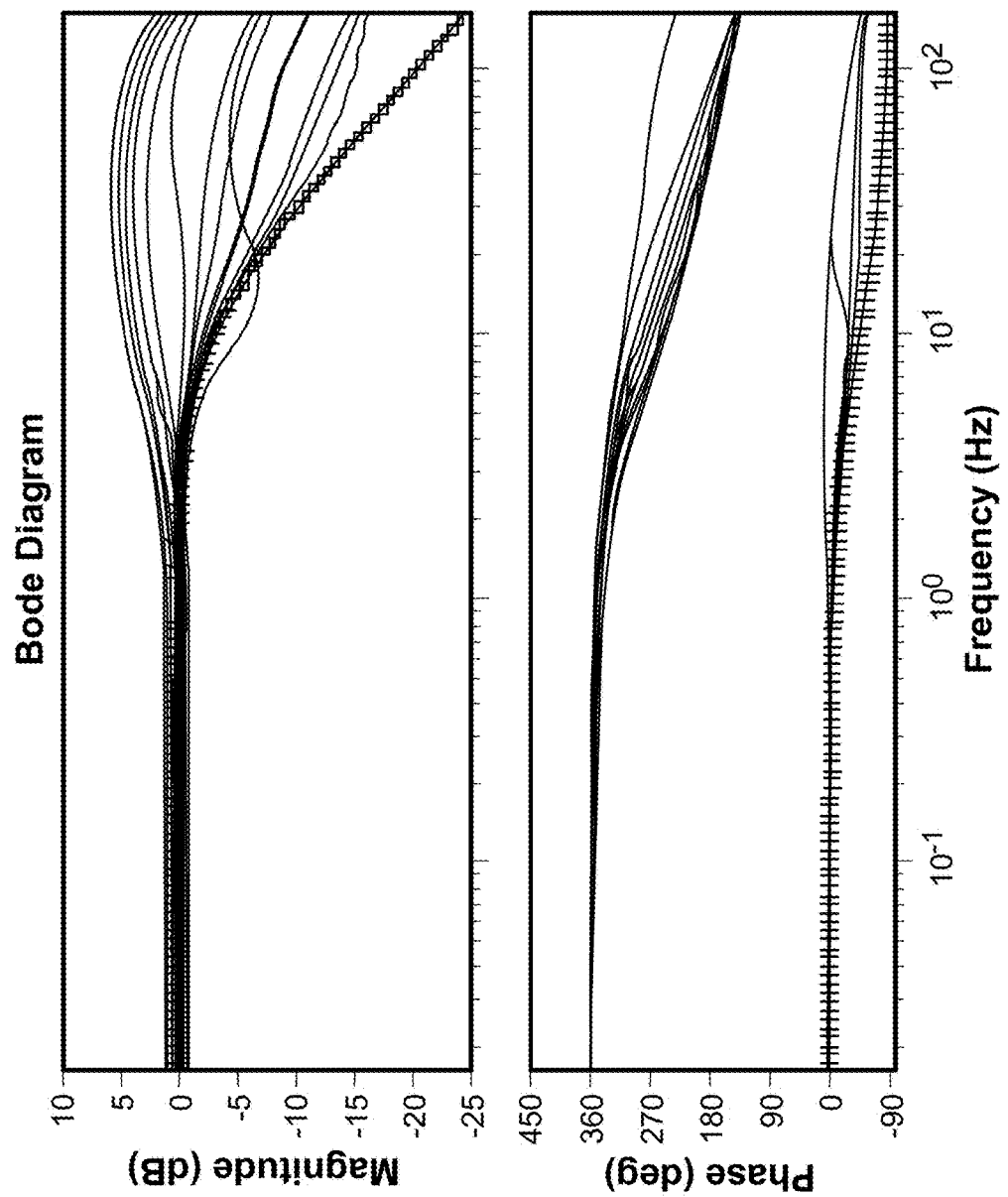
FIG. 3A is a graphical plot of an example frequency-domain response of deviations from a nominal model due to uncertainty.
Figure 3B:
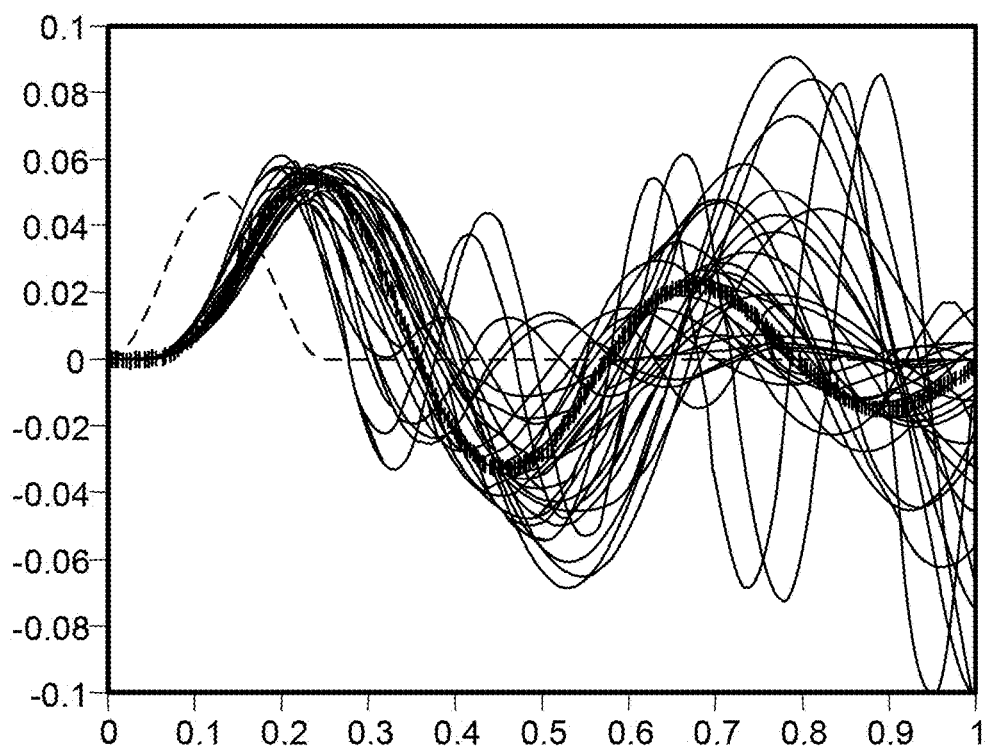
FIG. 3B is a graphical plot of an example time-domain response of controlled systems (under uncertainty) with a controller that is designed for a nominal model.

FIG. 3A is a graphical plot of an example frequency-domain response of a model that deviates from a nominal model due to uncertainty. FIG. 3B is a graphical plot of an example time-domain response of the corresponding controlled systems (under uncertainty) with the controller being designed for the nominal model. FIG. 3B shows that the controlled system may be unstable due to uncertainty.

In particular, FIG. 3A shows the frequency and phase response Bode plots of transfer functions of 40 samples of deviations from a nominal model of downhole drilling equipment (e.g., a BHA, drill string, or other equipment) dynamics under uncertainty. The samples are generated within a predefined uncertainty bound from the nominal model. It can be seen that the set of models that deviate from the nominal model vary largely in frequency response from the nominal system (shown with crosses). FIG. 3B shows the dynamic tracking error for a set of deviated models with respect to an initial pulse disturbance (represented by the dashed curve), using a non-robust controller designed for a nominal model of downhole drilling equipment dynamics. It can be seen that, although the controlled nominal model is stable and has successfully suppressed the impact of the pulse disturbance (the crosses in FIG. 3B), the other sampled models may be unstable from the same disturbance, using the same non-robust controller.

Figure 3C:
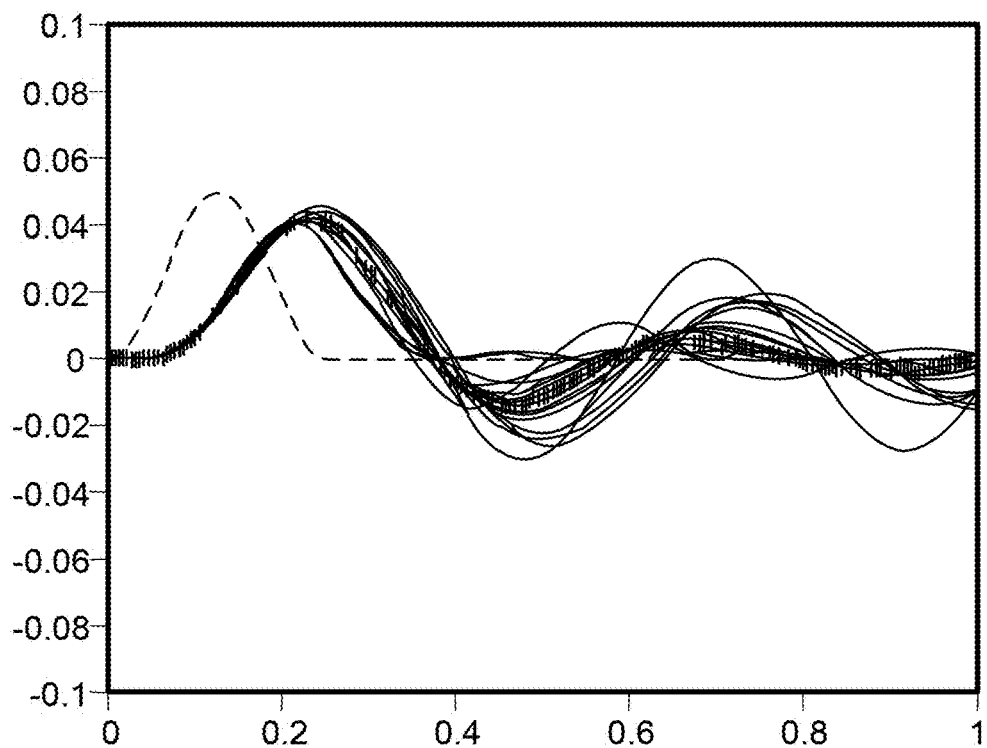
FIG. 3C is a graphical plot of an example time response of the controlled systems (under uncertainty) with the robust controller being developed for the nominal model.

FIG. 3C is a graphical plot of an example time-domain response of controlled systems (under uncertainty) with a robust controller that is designed for a nominal model. The example in FIG. 3C shows that the controlled systems remain stable in the presence of uncertainty. The example in FIG. 3C shows a dynamic tracking error for a set of deviated models with respect to an initial pulse disturbance, using a robust controller designed for a nominal model. It can be seen that the entire set of 40 models that deviate from the nominal system remain stable and reject the pulse disturbance.

Figure 4:
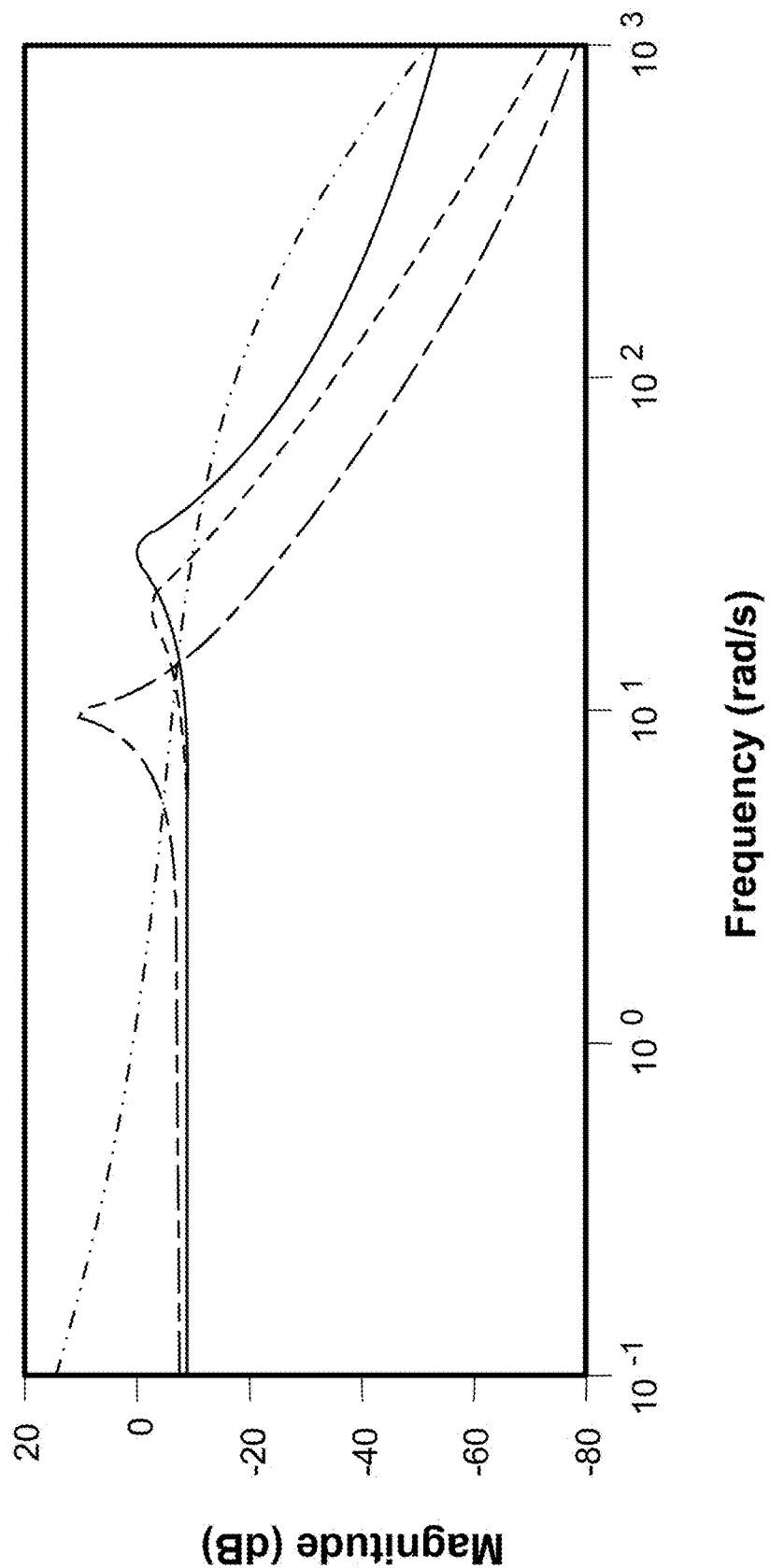
FIG. 4 is a graphical plot of an example frequency response open loop transfer function of a robust controlled system, compared to the uncontrolled systems.

FIG. 4 is a graphical plot of an example open loop transfer function of a robust controlled system, compared to uncontrolled systems. The example in FIG. 4 illustrates the suppression of disturbance based on frequency domain controller design. Three sampled Bode plots are shown in FIG. 4 (with dashed lines), corresponding to three models that deviate from the nominal model (solid line) of downhole drilling equipment dynamics. Each of the three models has a peak corresponding to, for example, a disturbance at different operating points which should be avoided. The designed controlled system may have a Bode plot of an open loop transfer function with the peaks removed, for example in the shape of the smooth curve.

In some examples, a set of models that deviates from a nominal model may be used to generate a robust stable controller for the drilling operation. For example, the set of models may represent uncertainty deviations from a nominal model of the drilling dynamics, and a controller may be generated to satisfy a stability criterion for one or more of the models that deviate from the nominal model. Such a controller may thus be stable for a drilling operation even if the true drilling dynamics deviates from the nominal model. The set of models that deviate from the nominal model may be determined based on an uncertainty associated with the nominal model. For example, if the nominal model includes a parameter, then a set of models that deviate from the nominal model may be determined by considering a set of values for the parameter (e.g., a range of values, or discrete values, etc.) and generating a set of models corresponding to the set of values for the parameter. In this example, the set of models that are generated may thus reflect the uncertainty associated with the nominal model.

The stability criterion may be determined, and adjusted, based on a desired level of robustness for the drilling operation. For example, the stability criterion may be a strict stability criterion, such as a bounded-input-bounded-output criterion (e.g., an H-inf stability criterion), for each model in a set of models that deviate from the nominal model. As a specific example, the set of models may correspond to a range of parameter values, up to a particular parameter threshold. Such a criterion may help guarantee a stable drilling operation for any deviation from the nominal model up to that particular parameter threshold.

In some examples, the stability criterion may be more relaxed than the strict stability criterion in the previous example. For example, the stability criterion may include a randomized stability criterion, such as one used in a randomized algorithm (RA) controller. For example, a random subset of models may be generated from a larger set of models that deviate from the nominal model of downhole drilling dynamics. The virtual controller may be generated to satisfy a stability criterion (e.g., H-inf, H-2, or any other suitable stability criterion) for each model in the random subset of models (but not necessarily in the larger set of models). The random subset of models may be determined, for example, by determining a random set of parameter values and generating a model for each random parameter value.

The random subset of models may be chosen, for example, to accurately model possible deviations that may occur from the nominal model during the actual drilling operation. In some examples, the random subset of models values may be chosen to exclude some models, such as models that are impractical or unlikely to occur. In general, including more models in the random subset of models may create a more strict design constraint (e.g., if the controller must stabilize the drilling for all models in the subset of models), resulting in a conservative controller that attempts to stabilize the drilling for a wider range of possible deviations. Thus, both the number of models in the random subset of models, as well as the particular choice of models, may affect how conservatively or how aggressively the drilling operates.

FIGS. 5A and 5B are flow diagrams of example design procedures for robust stability controllers. FIG. 5A shows an example process 500 for the design of an Hinf-LS controller 502. The Hinf-LS is a frequency domain robust control method for linear systems. It can be applied to a drill string system which is linearized around different operating points, or when there is a linear model to describe the drilling system, such as the identified linear model shown in the plots of FIGS. 3A, 3B, 3C, and 4. In an Hinf-LS controller design, the open loop singular values of the nominal model 504 of downhole drilling equipment (e.g., a BHA, drill string, or other equipment) dynamics may be inspected and shaped by the pre- and/or post-compensation weighting functions W1 (506) and W2 (508) such that nominal performance specifications are met. In general, the open loop gain may be designed to be high over low frequency via pre-compensation weight W1 (506) for the system to better follow a reference signal or better reject disturbances. In some examples, this may be due to the reference signal and disturbances typically having low frequency values. In particular, the weight W1 may be designed to have notches over the frequencies where bit damaging vibration may happen so that the drill system's sensitivity functions will be attenuated. Moreover, the open loop gain may be designed to be low over high frequencies via W2 (508) for the system to account for model uncertainties 510 and to reject measurement noise. In some examples, this may be due to model uncertainties 510 and measurement noises having high frequency values.

A stabilizing controller 502 with required stabilizing margin (which may be determined, for example, by the uncertainty bound between the nominal model and true drill string dynamics) may then be designed to reach the weighted transfer function. The weights W1 and W2 may be subject to adjustment iteratively until the resulting controlled nominal model's stability margin satisfies a desired stability margin. Compared to conventional H-inf design method, the design procedure in Hinf-LS is systematic and may only involve basic loop shaping knowledge and may thus be more applicable to real time adjustment.

FIG. 5B shows an example process 512 of designing an RA controller. During a drilling process, there may be dynamics and interactions that are difficult to represent with a deterministic model. Examples of such dynamics include the dissipation of rotary energy from the top drive to bit as a function of the structural and flexural properties of the drill string; the shape of wellbore; the shape of the tools; the changing pattern of touch-points between drill-string, wellbore and casing; the coefficients of normal and tangential restitution, and contact friction; the complex multi-body abrasion and erosion taking place between wellbore, drill string, fluid and cuttings, and so on. In some examples, these complexities may be characterized by a probabilistic drill string model in which parameters, such as the stiffness and damping coefficients of the drilling string, the friction coefficients of the bit rock interactions in a lump mass model, may be random variables with certain distribution that reflects the true drill system's uncertainties.

In comparison to the Hinf-LS controller, which may be adopted for the robust control of a drill string described by a deterministic nominal model, the RA controller may be adopted for the robust control of a drill string that is described by a probabilistic drill string model. The designed RA controller may not guarantee that the drill string meets the performance specifications for all uncertain events of interest, but it may ensure that the drill string meets performance specifications with a desired probability for the nominal model and associated deviations.

Compared to the H-inf controller, which is designed to satisfy a given performance requirement for all the bounded uncertainty events in drill string and may thus result in a relatively conservative controller, an RA controller may result in a more aggressive robust controller that satisfies the performance requirement in most, but not all, of the uncertainty events. A typical RA controller design stage may proceed as follows: a nominal model is determined with a particular model of uncertainty (514). At each iteration k, N(k) i.i.d. (identical independent distributed) models are randomly generated that deviate from the nominal model (516). The random models may be selected according to a distribution of uncertainties of either the transfer function or the parameters of the nominal model. The size N(k) may be chosen based on any suitable criteria, such as a predefined risk probability allowed in the overall controller design, a desired level of aggressiveness in the drilling, etc. For example, larger values of N(k) may be chosen to achieve a lower risk probability of instability, at the cost of a more conservative controller design. Conversely, smaller values of N(k) may be chosen (e.g., only those deviations that are most likely to occur, or those deviations whose likelihood of occurrence is above a threshold, etc.) to allow a larger risk probability of instability, while enabling more aggressive drilling operations. In addition, or as an alternative, to choosing the number of models, other factors may be chosen or designed, such as the probabilistic model of the deviations from the nominal model, the technique by which model deviations are sampled from the distribution of models, etc.

Initially, a controller (e.g., a virtual controller) may be initialized (518) to be any controller from a possible pool of controllers. For example, the controllers may include H-inf controllers, or H2 controllers, or any suitable controller designed with any suitable stability criterion. At the k-th iteration, the set of N(k) models that deviate from the nominal model are controlled by a candidate controller θ(k). If the candidate controller θ(k) manages to stabilize all the N(k) models to satisfy the performance specification, then the RA controller is set to be θ(k) (520). If the controller θ(k) fails to stabilize any of the N(k) models, then the controller θ(k) and the number of models N(k) are updated for a new iteration (522). This process repeats until θ(k) converges to a stabilizing solution. The resulting RA controller is guaranteed to satisfy the desired performance specification under a predefined probabilistic risk criterion. The process 512 described in FIG. 5B is just one example of designing an RA controller, and there are other types of RA design algorithms that can be adopted for the drill string model robust controller design.

Figure 6:
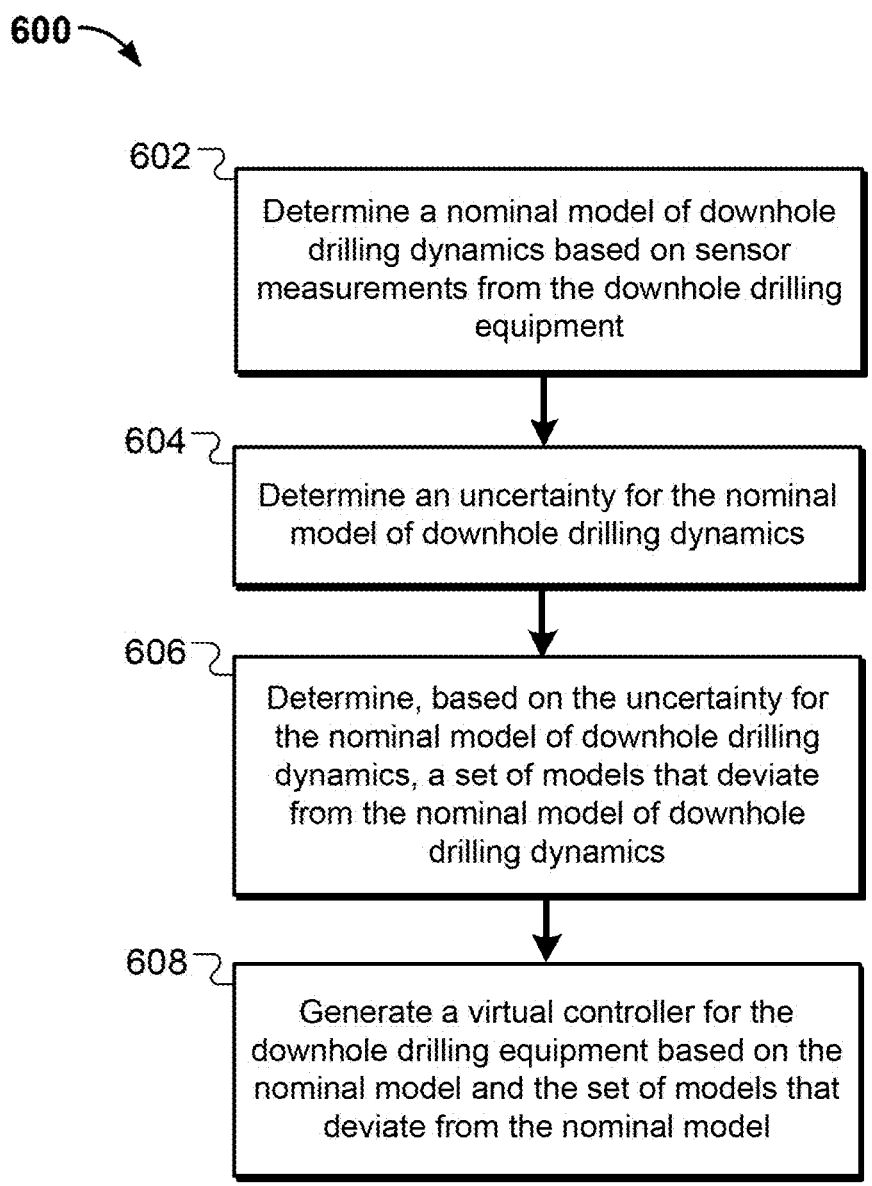
FIG. 6 is a flow chart of an example process for designing a robust controller (e.g., a virtual controller)

FIG. 6 is a flow chart of an example process 600 for designing a robust controller. One or more steps of the example process of FIG. 6 may be performed by a control system (e.g., control system 132 in FIG. 1). In this example, the control system determines a nominal model of downhole drilling dynamics (e.g., nominal model 504 in FIG. 5A or nominal model 514 in FIG. 5B, as determined, for example, by system ID module 210 in FIG. 2) based on sensor measurements from the downhole drilling equipment (e.g., a BHA, a drill string, or other downhole drilling equipment) (602). The control system then determines an uncertainty for the nominal model of downhole drilling dynamics (604). The control system then determines, based on the uncertainty for the nominal model of downhole drilling dynamics, a set of models that deviate from the nominal model of downhole drilling dynamics (606). The control system then generates a virtual controller for the downhole drilling equipment based on the nominal model and the set of models that deviate from the nominal model (608).

Figure 7A:
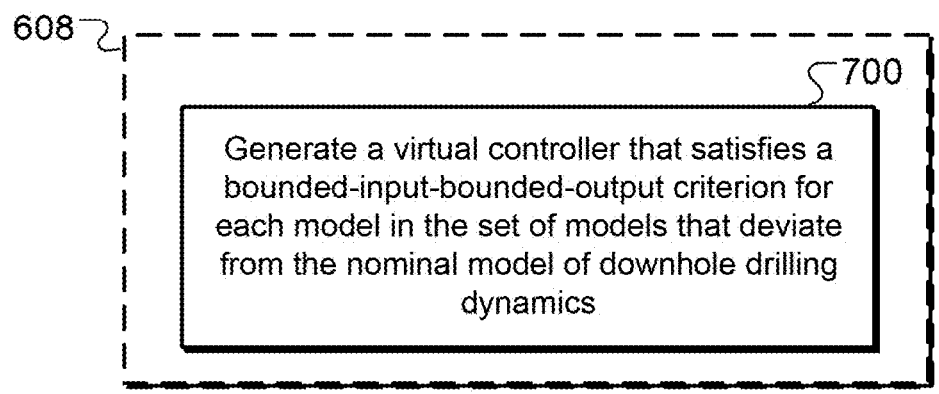
FIGS. 7A and 7B are flow charts illustrating example processes of generating a virtual controller for a downhole drilling equipment based on a nominal model of downhole drilling equipment dynamics and a set of models that deviate from the nominal model.
Figure 7B:
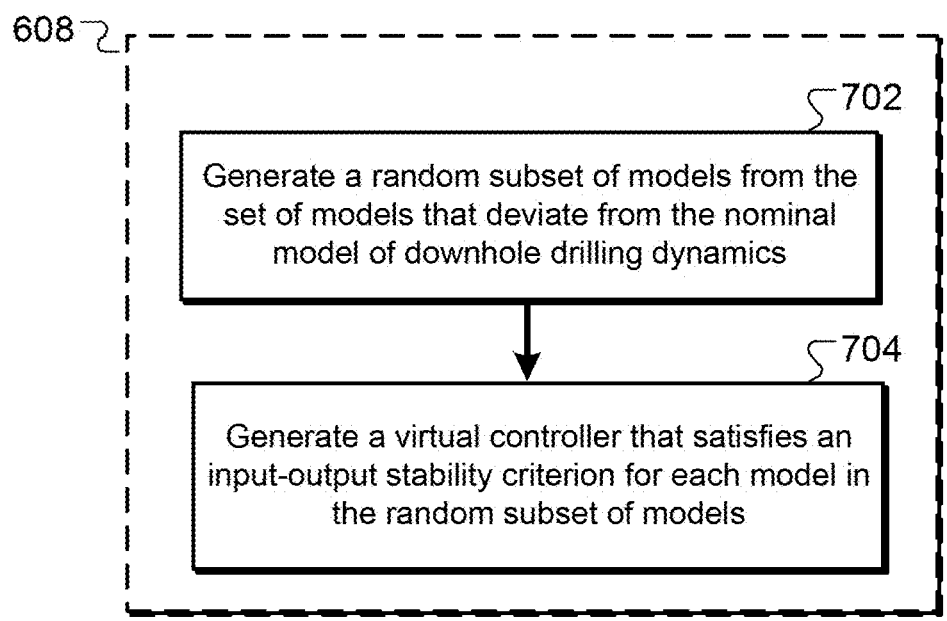

FIGS. 7A and 7B are flow charts of examples of further details of generating a virtual controller for the downhole drilling equipment based on the nominal model of downhole drilling dynamics and the set of models that deviate from the nominal model (e.g., 608 in FIG. 6). In FIG. 7A, an example process of designing an H-infinity controller is illustrated, in which the control system (e.g., control system 132 in FIG. 1) generates a virtual controller that satisfies a bounded-input-bounded-output criterion for each model in the set of models that deviate from the nominal model of downhole drilling dynamics (700). In FIG. 7B, an example process of generating an RA controller is illustrated, in which the control system (e.g., control system 132 in FIG. 1) generates a random subset of models from the set of models that deviate from the nominal model of downhole drilling dynamics (702) and generates a virtual controller that satisfies an input-output stability criterion (e.g., an H-infinity stability criterion, or an H-2 stability criterion, or a randomized stability criterion, etc.) for each model in the random subset of models (704).

Figure 8:
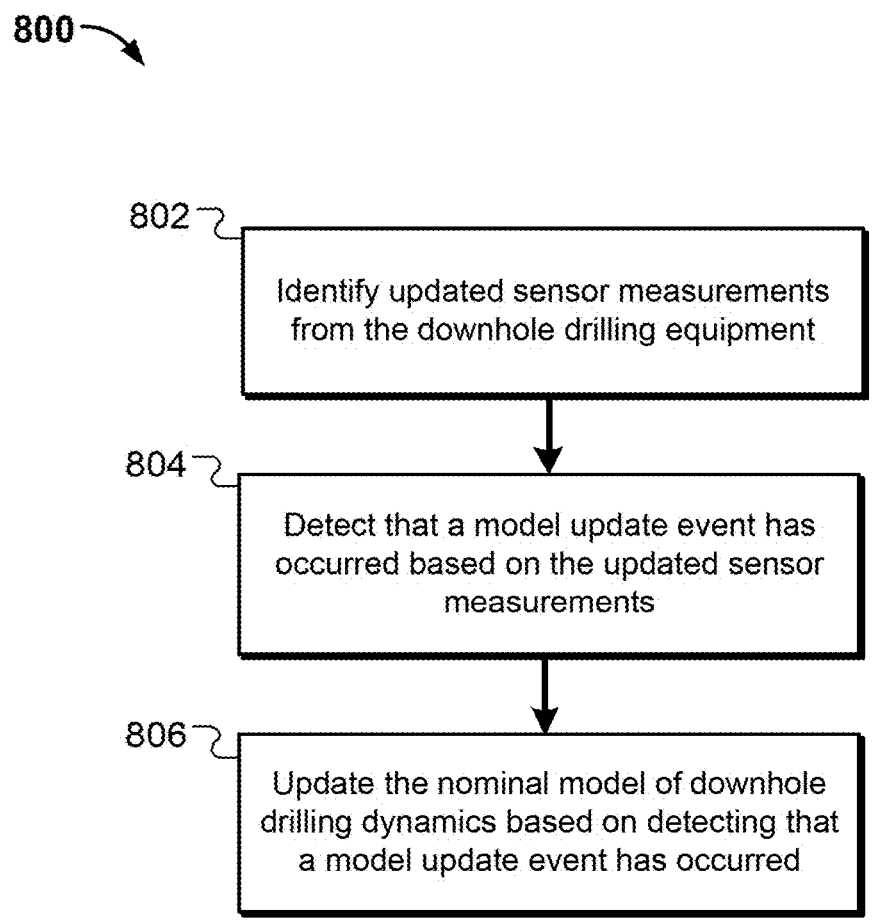
FIG. 8 is a flow chart of an example process of updating a nominal model of downhole drilling equipment dynamics.

FIG. 8 is a flow chart of an example process 800 of updating the nominal model of downhole drilling dynamics. In this example, the control system (e.g., control system 132 in FIG. 1) identifies updated sensor measurements from the downhole drilling equipment (802). The control system detects that a model update event has occurred based on the updated sensor measurements (804) and updates the nominal model of downhole drilling dynamics based on detecting that a model update event has occurred (806).

Figure 9:
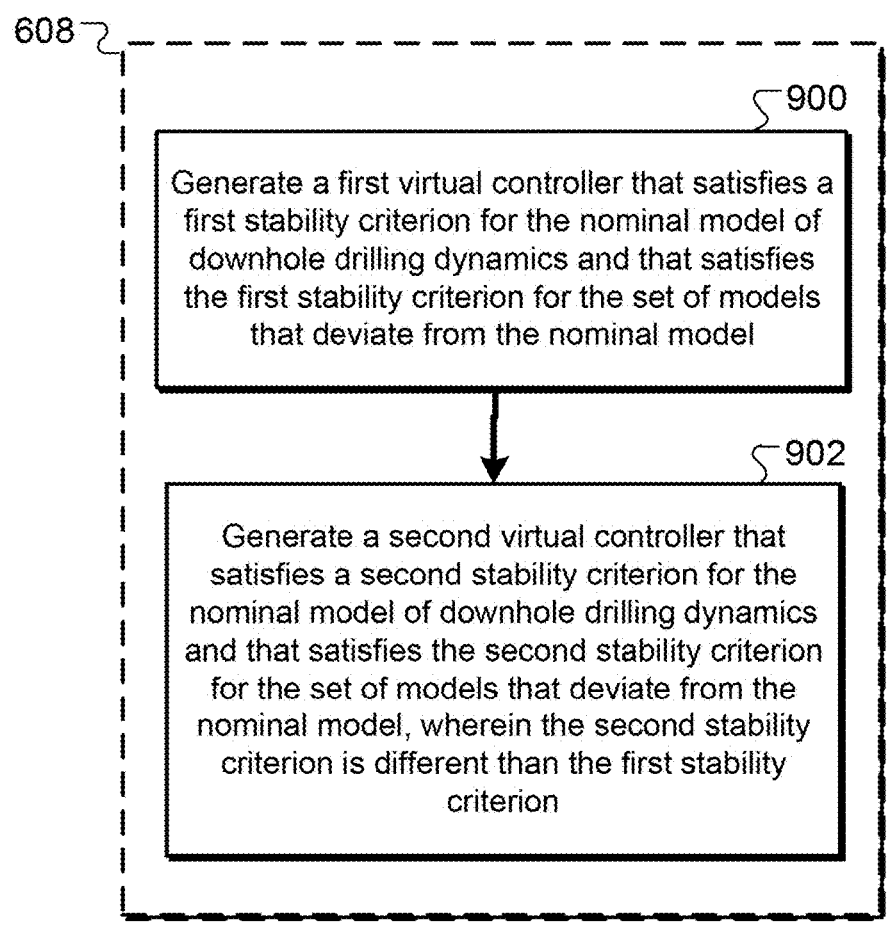
FIG. 9 is a flow chart of an example process of generating two virtual controllers that use different stability criteria.

FIG. 9 is a flow chart of an example of further details of generating a virtual controller for the downhole drilling equipment based on the nominal model of downhole drilling dynamics and the set of models that deviate from the nominal model (e.g., 608 in FIG. 6). In this example, the control system (e.g., control system 132 in FIG. 1) generates a first virtual controller that satisfies a first stability criterion for the nominal model of downhole drilling dynamics and that satisfies the first stability criterion for the set of models that deviate from the nominal model (900). The control system then generates a second virtual controller that satisfies a second stability criterion for the nominal model of downhole drilling dynamics and that satisfies the second stability criterion for the set of models that deviate from the nominal model, wherein the second stability criterion is different than the first stability criterion (902).

Figure 10:
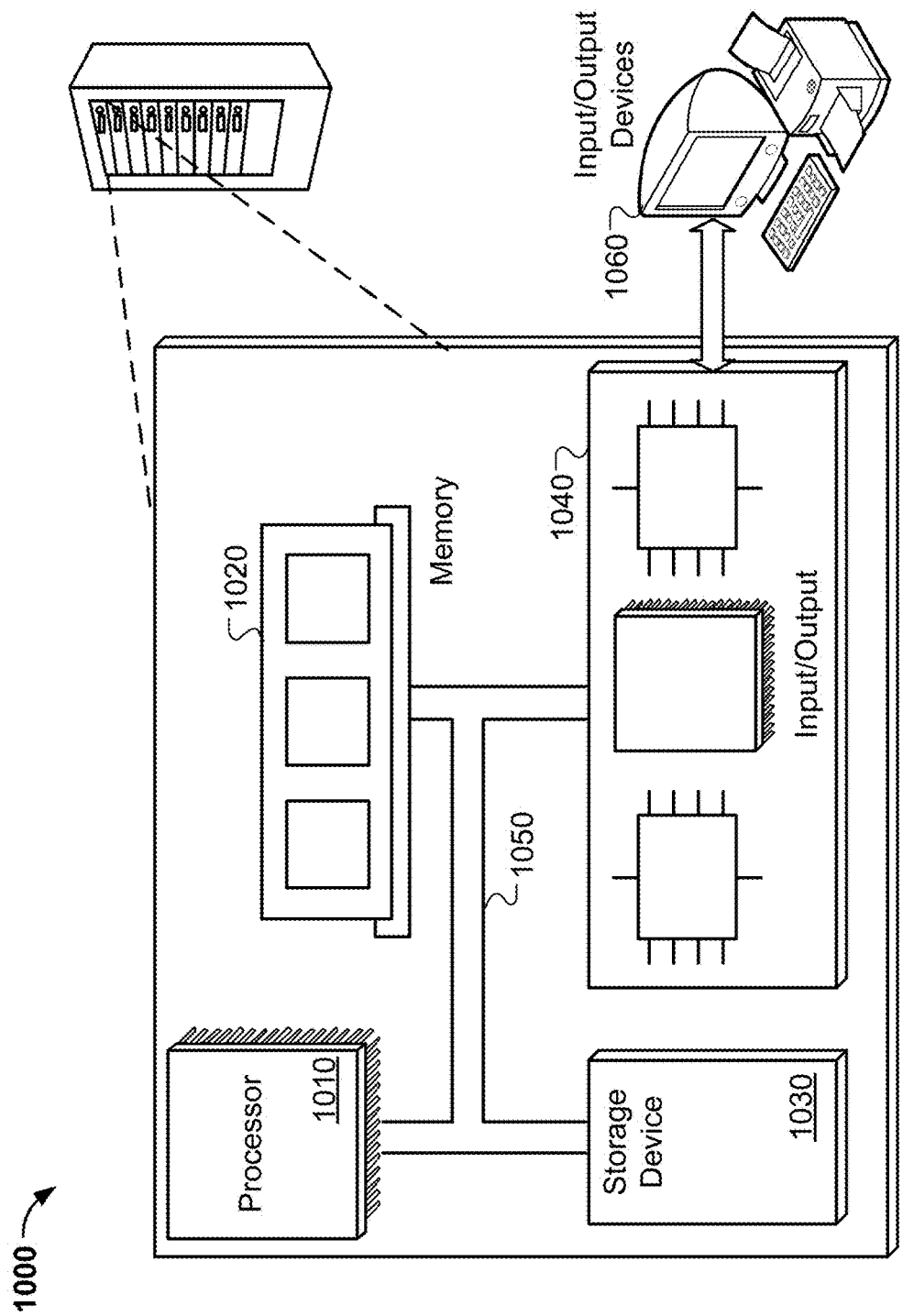
FIG. 10 is a block diagram of an example of a control system on which some examples may operate.

FIG. 10 is a block diagram of an example of a computer system 1000. For example, referring to FIG. 1, one or more parts of the control system 132 or the BHA 118 or other downhole drilling equipment could be an example of the system 1000 described here, such as a computer system used by any of the users who access resources of the wellbore system 100. The system 1000 includes a processor 1010, a memory 1020, a storage device 1030, and an input/output device 1040. Each of the components 1010, 1020, 1030, and 1040 can be interconnected, for example, using a system bus 1050. The processor 1010 is capable of processing instructions for execution within the system 1000. In some implementations, the processor 1010 is a single-threaded processor. In some implementations, the processor 1010 is a multi-threaded processor. In some implementations, the processor 1010 is a quantum computer. The processor 1010 is capable of processing instructions stored in the memory 1020 or on the storage device 1030. The processor 1010 may execute operations such as determining a model of downhole drilling dynamics, generating a virtual controller, or updating a model of the downhole drilling dynamics (e.g., FIGS. 6-9).

The memory 1020 stores information within the system 1000. In some implementations, the memory 1020 is a computer-readable medium. In some implementations, the memory 1020 is a volatile memory unit. In some implementations, the memory 1020 is a non-volatile memory unit.

The storage device 1030 is capable of providing mass storage for the system 1000. In some implementations, the storage device 1030 is a computer-readable medium. In various different implementations, the storage device 1030 can include, for example, a hard disk device, an optical disk device, a solid-date drive, a flash drive, magnetic tape, or some other large capacity storage device. In some implementations, the storage device 1030 may be a cloud storage device, e.g., a logical storage device including multiple physical storage devices distributed on a network and accessed using a network. In some examples, the storage device may store long-term data, such as rock formation data or ROP design capabilities. The input/output device 1040 provides input/output operations for the system 1000. In some implementations, the input/output device 1040 can include one or more of a network interface devices, e.g., an Ethernet card, a serial communication device, e.g., an RS-232 port, and/or a wireless interface device, e.g., an 802.11 card, a 3G wireless modem, a 4G wireless modem, or a carrier pigeon interface. A network interface device allows the system 1000 to communicate, for example, transmit and receive instructions to and from the control system 132 or the BHA 118 in FIG. 1. In some implementations, the input/output device can include driver devices configured to receive input data and send output data to other input/output devices, e.g., keyboard, printer and display devices 1060. In some implementations, mobile computing devices, mobile communication devices, and other devices can be used.

A server (e.g., a server forming a portion of the control system 132 or the wellbore system 100 shown in FIG. 1) can be realized by instructions that upon execution cause one or more processing devices to carry out the processes and functions described above, for example, such as determining models for downhole drilling dynamics, determining an uncertainty for a model of downhole drilling dynamics, and generating virtual controllers (e.g., FIGS. 6-9). Such instructions can include, for example, interpreted instructions such as script instructions, or executable code, or other instructions stored in a computer readable medium. Different components of a wellbore system 100 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made. For example, additional aspects of process 600 may include more steps or fewer steps than those illustrated in FIGS. 6-9. Further, the steps illustrated in FIGS. 6-9 may be performed in different successions than that shown in the figures. Moreover, although the concepts have been described in the context of a wellbore drilling system, the concepts could be applied to other processes as well. For example, in connection with medical endoscopic examination or other applications where an instrument is inserted and controlled inside of an unknown environment. Accordingly, other implementations are within the scope of the following claims.

What is claimed is:

1. A computer-implemented method of controlling downhole drilling equipment, the method comprising:
   determining a nominal model of downhole drilling dynamics based on sensor measurements from the downhole drilling equipment, wherein the downhole drilling equipment comprises at least one of a bottom hole assembly or a drill string;
   determining an uncertainty for the nominal model of downhole drilling dynamics;
   determining, based on the uncertainty for the nominal model of downhole drilling dynamics, a set of models that deviate from the nominal model of downhole drilling dynamics;
   generating a virtual controller for the downhole drilling equipment based on the nominal model and the set of models that deviate from the nominal model; and
   controlling the downhole drilling equipment using the virtual controller to reduce risks of uncertainty-induced drilling failures.

2. The computer-implemented method of claim 1, wherein generating a virtual controller for the downhole drilling equipment based on the nominal model and the set of models that deviate from the nominal model comprises generating a virtual controller for the downhole drilling equipment that satisfies a stability criterion for the nominal model and that satisfies the stability criterion for the set of models that deviate from the nominal model.

3. The computer-implemented method of claim 2, wherein generating a virtual controller for the downhole drilling equipment that satisfies a stability criterion for the nominal model of downhole drilling dynamics and that satisfies the stability criterion for the set of models that deviate from the nominal model of downhole drilling dynamics comprises generating a virtual controller that satisfies a bounded-input-bounded-output criterion for each model in the set of models that deviate from the nominal model of downhole drilling dynamics.

4. The computer-implemented method of claim 3, wherein the bounded-input-bounded-output criterion comprises an H-infinity stability criterion.

5. The computer-implemented method of claim 2, wherein generating a virtual controller for the downhole drilling equipment that satisfies a stability criterion for the nominal model of downhole drilling dynamics and that satisfies the stability criterion for the set of models that deviate from the nominal model of downhole drilling dynamics comprises:
   generating a random subset of models from the set of models that deviate from the nominal model of downhole drilling dynamics; and
   generating a virtual controller that satisfies an input-output stability criterion for each model in the random subset of models.

6. The computer-implemented method of claim 5, wherein the input-output stability criterion comprises at least one of an H-infinity stability criterion or an H-2 stability criterion.

7. The computer-implemented method of claim 5, wherein determining an uncertainty for the nominal model of downhole drilling dynamics comprises determining a statistical distribution of a parameter of the nominal model of downhole drilling dynamics, and determining, based on the uncertainty for the nominal model of downhole drilling dynamics, a set of models that deviate from the nominal model of downhole drilling dynamics comprises determining a set of random parameter values selected randomly from the statistical distribution of the parameter.

8. The computer-implemented method of claim 2, further comprising determining a model of vibrational disturbances for the downhole drilling equipment, and wherein generating a virtual controller for the downhole drilling equipment comprises generating a virtual controller for the downhole drilling equipment that satisfies the stability criterion, subject to the model of vibrational disturbances.

9. The computer-implemented method of claim 8, wherein the model of vibrational disturbances comprises a frequency characteristic of the nominal model of downhole drilling dynamics, and generating a virtual controller for the downhole drilling equipment that satisfies the stability criterion, subject to the model of vibrational disturbances, comprises generating a virtual controller that attenuates frequencies at which the frequency characteristic of the nominal model of downhole drilling dynamics has a gain exceeding a gain threshold.

10. The computer-implemented method of claim 1, further comprising:
identifying updated sensor measurements from the downhole drilling equipment;
detecting that a model update event has occurred based on the updated sensor measurements; and
updating the nominal model of downhole drilling dynamics based on detecting that a model update event has occurred.

11. The computer-implemented method of claim 10, further comprising:
receiving high-fidelity sensor measurements according to a first time-scale, and updating the nominal model of downhole drilling dynamics based on the high-fidelity sensor measurements according to the first time-scale; and
configuring the virtual controller to apply control inputs to the downhole drilling equipment according to a second time-scale that is faster than the first time-scale, based on low-fidelity sensor measurements that are received according to the second time-scale.

12. The computer-implemented method of claim 10, wherein detecting that a model update event has occurred comprises:
determining a divergence threshold for the nominal model of downhole drilling dynamics; and
determining that a difference between the nominal model of downhole drilling dynamics and sensor measurements exceeds the divergence threshold.

13. The computer-implemented method of claim 12, wherein determining a divergence threshold for the nominal model of downhole drilling dynamics further comprises determining the divergence threshold based on at least one of a planned wellbore path or a wellbore tracking error constraint.

14. The computer-implemented method of claim 10, wherein updating the model of downhole drilling dynamics comprises updating a parameter in the nominal model of downhole drilling dynamics, and wherein the method further comprises updating the virtual controller based on the updated model of downhole drilling dynamics.

15. The computer-implemented method of claim 2, wherein generating a virtual controller for the downhole drilling equipment that satisfies a stability criterion for the nominal model of downhole drilling dynamics and that satisfies the stability criterion for the set of models that deviate from the nominal model comprises:
generating a first virtual controller that satisfies a first stability criterion for the nominal model of downhole drilling dynamics and that satisfies the first stability criterion for the set of models that deviate from the nominal model; and
generating a second virtual controller that satisfies a second stability criterion for the nominal model of downhole drilling dynamics and that satisfies the second stability criterion for the set of models that deviate from the nominal model, wherein the second stability criterion is different than the first stability criterion.

16. The computer-implemented method of claim 15, further comprising:
determining that a virtual controller switching event has occurred; and
switching between the first virtual controller and the second virtual controller based on determining that a virtual controller switching event has occurred.

17. The computer-implemented method of claim 16, wherein determining that a virtual controller switching event has occurred comprises:
determining a target steady-state value of a control input for the downhole drilling equipment based on the nominal model of downhole drilling dynamics;
comparing the steady-state value of the control input for the downhole drilling equipment with a measured value of the control input for the downhole drilling equipment; and
determining that a difference between the steady-state value of the control input for the downhole drilling equipment and the measured value of the control input for the downhole drilling equipment exceeds a tracking threshold.

18. The computer-implemented method of claim 16, wherein determining that a virtual controller switching event has occurred comprises:
determining a planned wellbore path; and
determining, from the planned wellbore path, that a probability of collision with another wellbore exceeds a collision threshold, or that a radius of curvature of the planned wellbore path falls below a radius threshold.

19. The computer-implemented method of claim 1, further comprising:
determining, based on the virtual controller for the downhole drilling equipment, a control input for the downhole drilling equipment based on a set of sensor measurements from the downhole drilling equipment; and
applying the control input to the downhole drilling equipment.

20. The computer-implemented method of claim 19, wherein determining a control input for the downhole drilling equipment comprises determining at least one of a weight-on-bit, a rate of penetration, a fluid flow rate, a torque at bit, a torque at rotary table, or an RPM.

21. A system comprising:
a first component located at or near a terranean surface;
downhole drilling equipment at least partially disposed within a wellbore at or near a subterranean zone, the downhole drilling equipment associated with at least one sensor and including at least one of a bottom hole assembly or a drill string; and
a processor communicably coupled to the first component and the downhole drilling equipment, the processor operable to perform operations comprising:
determining a nominal model of downhole drilling dynamics based on sensor measurements from the downhole drilling equipment;
determining an uncertainty for the nominal model of downhole drilling dynamics;
determining, based on the uncertainty for the nominal model of downhole drilling dynamics, a set of models that deviate from the nominal model of downhole drilling dynamics;
generating a virtual controller for the downhole drilling equipment based on the nominal model and the set of models that deviate from the nominal model; and controlling the downhole drilling equipment using the virtual controller to reduce risks of uncertainty-induced drilling failures.

22. A non-transitory computer-readable storage medium encoded with at least one computer program comprising instructions that, when executed, operate to cause at least one processor to perform operations for controlling drilling of downhole drilling equipment in a borehole, the operations comprising:

determining a nominal model of downhole drilling dynamics based on sensor measurements from the downhole drilling equipment, wherein the downhole drilling equipment comprises at least one of a bottom hole assembly or a drill string;

determining an uncertainty for the nominal model of downhole drilling dynamics;

determining, based on the uncertainty for the nominal model of downhole drilling dynamics, a set of models that deviate from the nominal model of downhole drilling dynamics;

generating a virtual controller for the downhole drilling equipment based on the nominal model and the set of models that deviate from the nominal model; and controlling the downhole drilling equipment using the virtual controller to reduce risks of uncertainty-induced drilling failures.

* * * * *